Nov. 21, 1950 R. R. GALBREATH 2,531,203
TELEPHONE SUBSTATION COUPLER FOR
CONVERSATION RECORDING
Filed Dec. 9, 1947
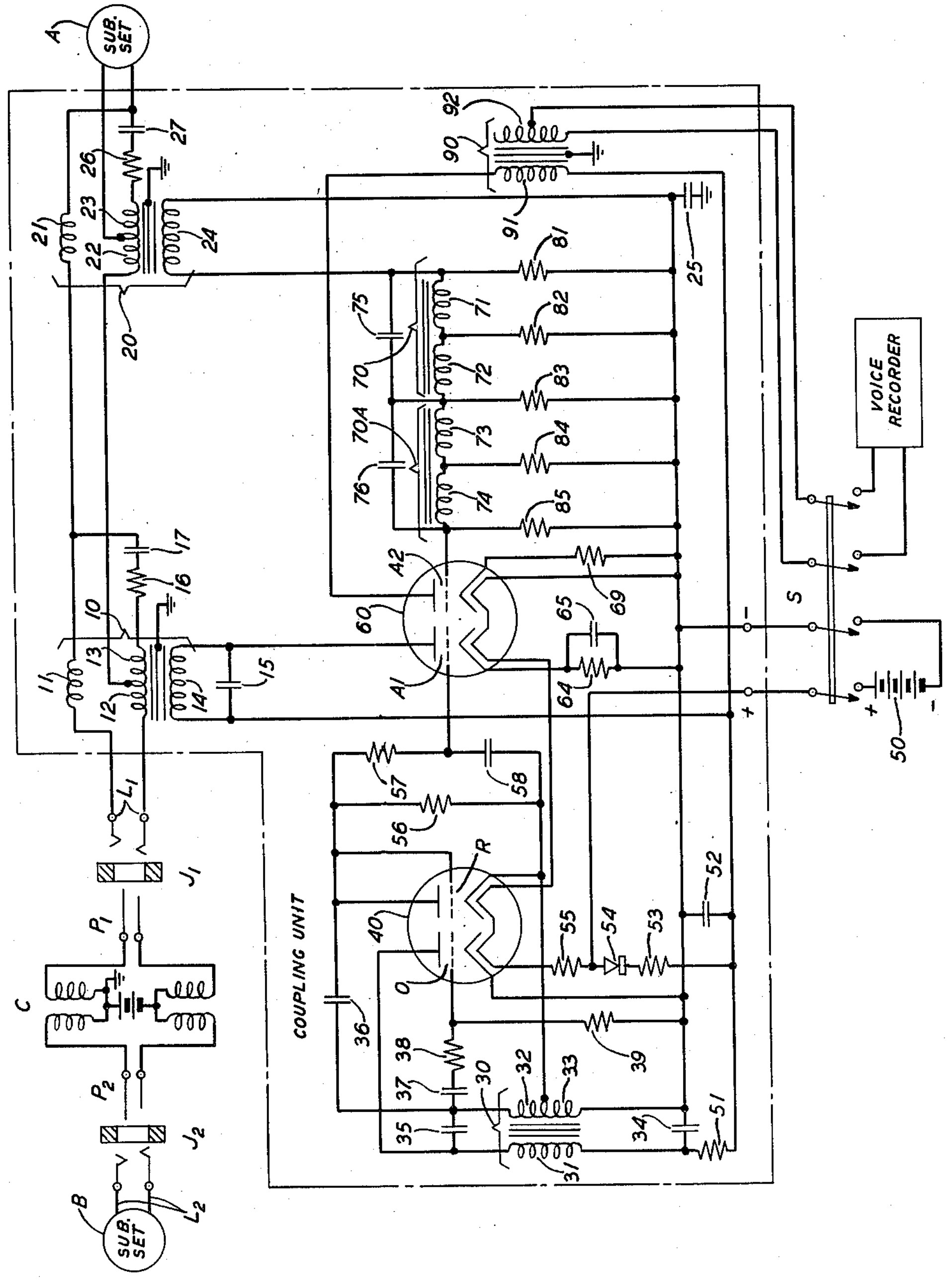
INVENTOR
R. R. GALBREATH
BY R. D. Covell
ATTORNEY Patented Nov. 21, 1950 2,531,203

UNITED STATES PATENT OFFICE 2,531,203

TELEPHONE SUBSTATION COUPLER FOR CONVERSATION RECORDING

Robert R. Galbreath, Bernardsville, N. J., assignor to Bell Telephone Laboratories, Incorporated, New York, N. Y., a corporation of New York Application December 9, 1947, Serial No. 790,663

11 Claims. (Cl. 179—6)

This invention relates to telephone systems and to the provision of means therein for recording telephone conversations at a subscriber station and under the subscriber's control.

Objects of the invention are the provision of coupling means at a subscriber station for coupling a voice recorder to the telephone line for recording, under the control of the subscriber, any conversation between that station and another telephone station, the transmission of a tone signal over the line to indicate that the conversation is being recorded and the transmission of some of the signal energy to the recorder, the minimization of transmission losses introduced due to the use of such coupling means at a subscriber station, and the prevention of any degradation of the telephone service due to the recording or the transmission of the recording signal.

According to this invention coupling means are provided at a subscriber station between the subscriber's telephone and line for coupling thereto a recorder for recording any conversation between this station and any other subscriber station, for transmitting over the telephone line a tone signal indicating that the conversation is being recorded, and for controlling the voice and signal level of the input to the recorder.

A feature of the invention is a coupling unit at a subscriber station interconnecting the telephone line, the subscriber's telephone and a voice recorder, the coupling unit being arranged to equalize the energy level of the input to the recorder from the two stations between which a talking connection is established.

Another feature of the invention is a coupling unit at a subscriber station interconnecting the telephone line, the subscriber telephone and a voice recorder, the coupling unit comprising means for transmitting a warning tone over the line to indicate that the conversation is being recorded, the connections between the line, telephone set and tone source being such as to minimize the level of the tone at the telephone set.

Another feature of the invention is a coupling unit at a subscriber station comprising two transformers interconnecting the telephone set and line, one of which couples a warning tone source to the line and the other of which couples a voice recorder to the line, whereby there is no direct connection between the telephone line and the recorder or between the line and the warning tone source. A further feature is that the warning tone source and input connection to the recorder each includes an amplifier energized from a common power supply so that, in case of failure of the tone source, the input connection to the recorder is disabled.

Another feature of this invention is a coupling unit at a subscriber station interconnecting the subscriber's telephone line, the subscriber's telephone set and a voice recorder, the coupling unit comprising oscillator means for cyclically generating a warning tone of constant amplitude for an interval of time and amplifying means for transmitting the warning tone to the line, the amplifier being so arranged that the warning tone decays to an inaudible level within a predetermined interval of time. For instance the oscillator may generate a tone of 1400 cycles which is constant in amplitude for .4 second and and which is transmitted for .2 second during which the tone level decays to a substantially inaudible level, the tone impulse being repeated every 15 seconds.

Another feature is a coupling and tone generating unit at a subscriber station interconnecting the telephone line, the subscriber telephone and a voice recorder, the coupling unit comprising means for generating and transmitting a warning tone over the line and means for controlling the level of warning tone transmitted to the recorder. For instance, an amplifier may be included in the connection between the line and recorder and filters be included in the input of the amplifier to reduce the level of the warning tone transmitted to the recorder.

A telephone system comprising a station including a coupling unit arranged in accordance with this invention and its various features is shown schematically in the drawing.

The system shown in the drawing comprises subscriber stations A and B connected by lines L1 and L2 respectively to a manual central office switchboard which is represented by jacks J1 and J2 and a double-ended cord C for interconnecting the jacks of calling and called lines. The station A is provided with a coupling unit and a voice recorder; and a similar unit may or may not be provided at station B. The operative connection of the recorder, which may be any known type of recorder adapted to record speech, is controlled by a switch S whereby it may be used on some calls and not used on other calls. In order that the subscriber at the other station with which station A is connected will know that the conversation is being recorded, when this is the case, the coupling unit includes means for transmitting over the line L1 a tone impulse of 1400 cycles per second once every fifteen seconds while the connection is maintained and the recorder is operatively connected to the line.

The tone and recorder coupling unit comprises magnetic core transformers 10, 20, 30, 70, 70A and 90, two vacuum tubes 40 and 60 each of which is a double triode, and a plurality of condensers and resistors. The left triode of tube 40 is connected as an oscillator O; the right triode of tube 40 is connected as a rectifier R; the left triode of tube 60 constitutes an amplifier A1; and the right triode of tube 60 constitutes an amplifier A2. Either an alternating current or a direct current voltage source may be used since the input connections are of the A. C.—D. C. type including a rectifier 54, resistor 53 and condenser 52. As shown, a battery 50 constitutes the source of energy.

Transformer 10 couples the output of tone amplifier A1 to the line L1 and transformer 20 couples the line L1 to the recorder input amplifier A2. Each of these transformers constitutes a balanced hybrid coil with the line winding divided into two parts. Reference may be had to Patent 1.566,012 granted to J. W. Horton, December 15, 1925, for a description of a balanced hybrid coil. The line windings 11 and 21 of transformers 10 and 20 are connected in series between one conductor of line L1 and one line terminal of the subscriber's telephone set, and line windings 12 and 22 of transformers 10 and 20 are connected in series between the other conductor of line L1 and the other line terminal of the subscriber's telephone set; so that these windings maintain the normal balance between the two conductors of the line. The line windings 11, 12, 21 and 22 have as low a total impedance as is practicable based on connection to a line of average length and resistance so as to hold the transmission loss introduced by the insertion of these windings in series with the line to an allowable value; and most of this total impedance resides in windings 11 and 12. The balancing winding 13 and line balancing network consisting of resistor 16 and condenser 17 are designed to balance the line and minimize the tone transmitted to the subset A. It will also be noted that there are no metallic connections between the tone source, the recorder and the telephone line. Electrostatic shields are provided for reducing longitudinal currents. The winding 14 of transformer 10 is included in the output circuit of the amplifier A1 and the impedance of winding 14 matches that of the plate circuit.

The transformer 30 and the left-hand triode of tube 40 together with condensers 34 and 35 constitute an oscillator of the well-known Hartley type which is tuned to generate an alternating potential of a frequency of 1400 cycles per second. The condenser 37 together with resistor 38 constitutes an oscillation blocking circuit which stops the oscillations about .4 second after the oscillator voltage builds up to a steady state. When the oscillator stops, the condenser 37 begins to discharge through resistor 39; and, at the end of about fifteen seconds, the oscillator resumes generation of the 1400 cycles per second tone. The oscillator output voltage is applied through condenser 58 to the grid of the amplifier A1, which is normally self-biased to provide the desired amplification. The right-hand triode of tube 40 is connected as a rectifier shunting resistor 56 so that condenser 58 is charged by the rectified voltage through resistor 57 to increase the bias of the grid of amplifier A1, whereby the tone transmitted through amplifier A1 and transformer 10 to the line L1 is reduced; and at the end of .2 second after the oscillator voltage reaches a steady state, the output of amplifier A1 has been reduced to a substantially inaudible level. When the oscillator stops, the charge on condenser 58 leaks off through resistors 57 and 56; and before the oscillator triode resumes generation of the 1400 cycles per second potential, the normal grid bias of amplifier A1 has been restored. Thus an impulse of 1400 cycles per second is transmitted through amplifier A1 and transformer 10 once every fifteen seconds, the impulse diminishing, from its initial steady state energy level to an inaudible level at the end of .2 second. The winding 14 and condenser 15 are tuned to reduce the transmission of power frequencies.

The windings of transformer 20 which couple the line to the recorder input amplifier A2 are designed so as to make the speech input from the subset roughly equal to that from the line. The winding 24, which is connected in the grid circuit of amplifier A2, is proportioned so that the voltage applied to the grid approximates the incoming line level. The network consisting of the balancing winding 23 of hybrid coil 20 in series with resistor 26 and condenser 27 is designed to balance a long line, thereby to provide the necessary sidetone reduction for such a line and minimize the amplitude of speech transmitted from the subset A to the input circuit of amplifier A2 that is, to minimize the amplitude of speech transmitted from the subset A to the input of the amplifier A2. The amplifier A2 and its output transformer 90 provide the required input for a 600-ohm recorder, the input level being about 6 decibels below the line level. To prevent the 1400 cycles per second warning tone from disabling the automatic volume control in the recorder, a two-section filter of the RCL type, comprising the windings of transformers 70 and 70A, condensers 75 and 76 and resistors 81 to 85, is provided in the input circuit of amplifier A2. The first section, comprising windings 71 and 72 of transformer 70 and condenser 75, is tuned to 1400 cycles per second, the fundamental frequency of the warning tone; and the second section, comprising windings 73 and 74 of transformer 70A and condenser 76, is tuned to the second harmonic, 2800 cycles per second. The filter introduces a loss in the transmission of the warning tone to the recorder without substantially affecting the transmission of speech to the recorder.

Heretofore arrangements for coupling a recorder to a telephone line have depended upon automatic volume control to provide equalization of the amplitude of the speech recorded from two interconnected subscriber stations; but such arrangements lack stability and have been complicated and unsatisfactory. By the use of two three-winding transformers or balanced hybrid coils, one to couple the line to a tone source and the other to couple the line to the recorder, as above described, the transmission loss introduced in a telephone connection between two subscriber stations is minimized, a warning tone is transmitted over the line to the distant station, the level of the tone transmitted to the subscriber at the station which is provided with the recorder is minimized, and the level of speech transmitted from this subscriber to the recorder is reduced so that the recorded speech from both subscribers is of about the same amplitude. By combining the warning tone generator with the two hybrid coils and the recorder amplifier in a single unit, a conventional subscriber station is readily modified to enable the recording of a conversation and also insure that the subscriber at the distant station be warned that the conversation is being recorded. It is particularly to be noted that a power failure which stops the generation of the warning tone is also effective to deenergize the amplifier A2 so that the conversation cannot be recorded without transmission of the warning tone to the telephone line.

What is claimed is:

1. In combination, a subscriber's telephone line, a subscriber telephone set comprising a transmitter and a receiver connected to said line, a voice recorder, electronic means operative to generate an intermittent tone of desired frequency, and means comprising two hybrid coils coupling said line, telephone set, recorder and tone source, windings of both of said coils being connected in series with said line and telephone set, another winding of one of said coils being connected to said electronic means, and another winding of the other of said coils being connected to said voice recorder, whereby voice currents are transmitted from said line and subset through one of said coils to said voice recorder and said intermittent tone is transmitted through the other hybrid coil to said line and through both of said hybrid coils to said recorder.

2. In a coupling and tone generating unit, a transformer for coupling a subscriber's telephone line to a voice recorder at the subscriber station, a generator for generating an interrupted tone, and a transformer for coupling said generator to said line, windings of both of said transformers being connected in series with said telephone line and station, another winding of one of said transformers being connected to said generator, and another winding of the other of said transformers being connected to said recorder, whereby a warning tone current is transmitted from said generator over the telephone line and to the recorder.

3. A coupling and tone generating unit for coupling a telephone subscriber line to a voice recorder, said unit comprising means including a first transformer for coupling the line to the recorder, means for generating an interrupted tone of a desired frequency, means including a vacuum tube amplifier and another transformer for coupling said generating means to said line, windings of both of said transformers being connected in series with said line, another winding of said first transformer being connected to said recorder, and another winding of said other transformer being connected to the output of said amplifier, and means comprising a rectifier and condenser connected to the output of said tone generating means for decreasing the potential of the grid of said amplifier with respect to the cathode at a predetermined rate whereby the tone current transmitted from said generating means to said line decays at a desired rate.

4. In combination, a telephone line and a subscriber telephone set connected thereto, a voice recorder at said station, and means including a coupling and tone generating unit for connecting said recorder to said line, said unit comprising first and second transformers and a tone source, each of said transformers having a line winding, one half of each of said line windings being connected in series between one conductor of said line and the telephone set and the other half of each of said line windings being connected in series between the other conductor of said line and the telephone set, said first transformer having windings inductively coupling said tone source to said line, said second transformer having windings inductively coupling said line to said recorder, a balancing winding of said first transformer and a first balancing network connected in series across the junction conductors connecting the corresponding halves of the line windings of both of said transformers for balancing said line to minimize the tone transmitted to said telephone set, and a balancing winding of said second transformer and a balancing network connected in series across said telephone set to reduce the level of the transmission from said subset to said recorder.

5. In a combination according to claim 4, an amplifier and output transformer interconnecting said second transformer and recorder and a filter connected in the input circuit of said amplifier tuned to reduce the level of the tone transmitted to the recorder.

6. In combination, a line, a telephone substation connected thereto, voice recording means, means including manually operable switching means for operatively connecting said recorder to said line and telephone station, and means rendered operative by the connection of said recording means to said line to impress upon said line currents having variations of audible frequency as an indication that recording is taking place, and means for varying the amplitude of said currents on said line during the time they are applied.

7. In a coupling and tone generating unit for coupling a subscriber's telephone line to a voice recorder at the subscriber station, a generator for generating a warning tone, a hybrid coil having a winding connected in series with said line and another winding coupling said generator to said line, a hybrid coil having a winding connected in series with said line and another winding coupling said line to said recorder, and means comprising an impedance network tuned to said tone interconnecting said other winding of the last-mentioned hybrid coil with said recorder, said network being effective to reduce the level of the tone transmitted to said recorder.

8. In a coupling and tone generating unit for coupling a subscriber station and telephone line to a voice recorder at the subscriber station and for transmitting a warning tone over said line and to the recorder, a generator for generating a warning tone, a hybrid coil having a line winding connected in series with said line and another winding coupling said generator to said line, a hybrid coil having one winding connected in series with said line and another winding coupling said line to said recorder, and means comprising a third winding of the first-mentioned hybrid coil and a line balancing network connected across said line in series with said line winding for minimizing the tone transmitted to the subscriber set.

9. In a coupling and tone generating unit for coupling a subscriber station and telephone line to a voice recorder at the subscriber station and for transmitting a warning tone over said line and to the recorder, a generator for generating a warning tone, a hybrid coil coupling said generator to said line, a hybrid coil coupling said line to said recorder, means comprising a balancing winding of the first-mentioned hybrid coil and a line balancing network for minimizing the tone transmitted to the subscriber set, and means comprising a balancing winding of the last-mentioned hybrid coil and another line balancing network for reducing the level of the voice currents transmitted from the subscriber set to the recorder.

10. In a coupling and tone generating unit for coupling a subscriber station and telephone line to a voice recorder at the subscriber station and for transmitting a warning tone over said line and to the recorder, a generator for generating a warning tone, a hybrid coil coupling said generator to said line, a hybrid coil coupling said line to said recorder, means comprising a balancing winding of the first-mentioned hybrid coil and a line balancing network for minimizing the tone transmitted to the subscriber set, and means comprising a tone filter for reducing the level of the tone transmitted from said generator through said hybrid coils to the recorder.

11. In a coupling and tone generating unit for coupling a subscriber station and telephone line to a voice recorder at the subscriber station and for transmitting a warning tone over said line and to the recorder, a generator for generating a warning tone, a hybrid coil coupling said generator to said line, a hybrid coil coupling said line to said recorder, means comprising a balancing winding of the first-mentioned hybrid coil and a line balancing network for minimizing the tone transmitted to the subscriber set, means comprising a balancing winding of the last-mentioned hybrid coil and another line balancing network for reducing the level of the voice currents transmitted from the subscriber set to the recorder, and means comprising a tone filter for reducing the level of the tone transmitted from said generator through said hybrid coils to the recorder.

ROBERT R. GALBREATH.

REFERENCES CITED

The following references are of record in the file of this patent:

UNITED STATES PATENTS

| Number | Name | Date |
|---|---|---|
| 1,654,633 | Bisbee | Jan. 3, 1928 |
| 1,763,169 | Mathes | June 10, 1930 |
| 1,845,034 | Bickelhoupt | Feb. 16, 1932 |
| 2,431,797 | Ffolliott | Dec. 2, 1947 |
| 2,441,840 | Petruschell | May 18, 1948 |